United States Patent
Herkenhoff et al.

(10) Patent No.: US 6,950,371 B2
(45) Date of Patent: Sep. 27, 2005

(54) METHOD FOR SIGNAL-TO-NOISE RATIO ENHANCEMENT OF SEISMIC DATA USING FREQUENCY DEPENDENT TRUE RELATIVE AMPLITUDE NOISE ATTENUATION

(75) Inventors: E. Fredrick Herkenhoff, Orinda, CA (US); Dennis G. Bones, Dublin, CA (US); Kendall Bong Hu Louie, Orinda, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 10/442,394

(22) Filed: May 20, 2003

(65) Prior Publication Data

US 2004/0233782 A1 Nov. 25, 2004

(51) Int. Cl.[7] .................................................. G01V 1/28
(52) U.S. Cl. ................................................ 367/47; 702/17
(58) Field of Search ............................. 367/38, 47; 702/17

(56) References Cited

U.S. PATENT DOCUMENTS

| | | | |
|---|---|---|---|
| 3,398,396 A | | 8/1968 | Embree |
| 3,622,967 A | * | 11/1971 | Foster et al. ............ 367/62 |
| 4,468,761 A | * | 8/1984 | Rietsch .................. 367/43 |
| 4,561,074 A | * | 12/1985 | Warmack ................ 367/46 |
| 4,561,075 A | * | 12/1985 | Smith et al. ............ 367/46 |
| 4,740,929 A | * | 4/1988 | Ehlers et al. ........... 367/46 |
| 4,882,713 A | * | 11/1989 | Hughes .................. 367/47 |
| 5,138,583 A | | 8/1992 | Wason et al. |
| 5,197,039 A | * | 3/1993 | Corcoran et al. ........ 367/52 |
| 5,719,822 A | | 2/1998 | Wang |
| 5,825,716 A | | 10/1998 | Starr |
| 5,986,973 A | | 11/1999 | Jerićević et al. |
| 6,446,008 B1 | | 9/2002 | Ozbek |
| 6,463,388 B1 | * | 10/2002 | Martinez ................ 702/17 |
| 6,519,205 B1 | | 2/2003 | Baeten et al. |
| 6,519,533 B1 | * | 2/2003 | Jeffryes ................. 702/17 |
| 6,574,567 B2 | | 6/2003 | Martinez |
| 6,636,809 B1 | | 10/2003 | Herrmann |
| 6,651,007 B2 | | 11/2003 | Ozbek |
| 6,691,039 B1 | | 2/2004 | Wood |

* cited by examiner

Primary Examiner—Bernarr E. Gregory
Assistant Examiner—Scott Hughes
(74) Attorney, Agent, or Firm—Richard J. Schulte

(57) ABSTRACT

A method for enhancing signal-to-noise (S/N) ratio of seismic data is presented. An ensemble of input traces is decomposed into a plurality of frequency bands of traces. Trace and signal power and then a maximum allowable signal-to-noise ratio are estimated for each frequency band. Weights are calculated which are functions of the inverse noise power or rms. The amplitudes in each of the traces are reformed using a fitting function which utilizes the estimated weights to create true relative amplitude signal enhanced traces. The weighting function has data adaptive parameters which can be changed to accommodate noise characteristics such coherency, incoherency, Gaussian and non-Gaussian distributions, etc. The method may be applied across many different coordinate systems. The method may be applied iteratively to seismic data to shape the noise distribution of the seismic data.

26 Claims, 5 Drawing Sheets

METHOD FOR SIGNAL-TO-NOISE RATIO ENHANCEMENT OF SEISMIC DATA USING FREQUENCY DEPENDENT TRUE RELATIVE AMPLITUDE NOISE ATTENUATION

TECHNICAL FIELD

The present invention relates generally to methods of enhancing the signal-to-noise (S/N) ratio in seismic data, and more particularly, to methods which use weighted stacking to attenuate noise in seismic traces.

BACKGROUND OF THE INVENTION

Seismic data obtained in field surveys include signals from subterranean formations, and also noise. The signals are produced by acoustic reflections or refractions from rock layers below the surface of the earth. Most raw land and marine seismic data closely conform to a reflection signal plus additive and/or convolutional noise model. The noise may be due to a number of sources such as power lines, motor vibrations and animal noise. In marine data, everything from swell, tow and propeller noise to shot generated direct waves, refractions and multiples to shipping, cetacean and other seismic crews act as additive noise relative to a reflected signal. Convolutional noise sources, like source and receiver coupling, processing and system noise are types of noise that also have to be accommodated. The different types of noise compromise the effectiveness of the end results of the processing of seismic data because the noise can overwhelm the signal. In such cases, the signal can be difficult, if not impossible, to interpret and quantify.

Diversity noise attenuation methods were invented in the mid 1960's by Geophysical Services Inc. (GSI) and were successfully used to extract signals from vibroseis sweep data recorded in areas having extreme amounts of cultural noise. The underlying principle of diversity noise attenuation is that seismic data are composed of nearly uniform strength signals and large amounts of additive noise. For vibroseis sweeps, samples are weighted inversely proportional to a local estimate of noise power before being summed with other sweeps. The less power in an arrival, the more likely that the arrival is signal.

Methods for improving the S/N ratio in seismic data are described in numerous patents. For example, one method is taught by U.S. Pat. No. 3,398,396 to Embree. This method utilizes the amplification of each trace as a function of the inverse ratio of the total power in each trace as compared to another trace. The amplified traces are then combined into a group of modified traces. Embree also suggests that input seismic data may be weighted in dependence upon the power in frequency components or bands. The signals, separated based on frequencies, are modulated on a frequency dependent noise based correcting function and are then summed to produce enhanced output traces.

A second method is taught by U.S. Pat. No. 5,138,583 to Wason et al. This method provides for attenuation of coherent and incoherent noise in seismic signals. Seismic signal data are transformed from a time-space domain using a Radon-transform domain. In the Radon-transform domain, coherent noise is attenuated by muting and incoherent noise is attenuated by diversity stacking. Data remaining in the Radon-transform domain are transformed back to the time-space domain by an inverse Radon transform.

Each of these methods has shortcomings. These methods do not produce output trace amplitudes preserving true relative signal amplitude within the total seismic data set. These previous methods approximate noise power with total trace power which incorrectly alters relative signal amplitudes. True relative signal amplitude refers to the changes in signal component of the output amplitude being directly proportional to relative changes in subsurface interface reflection coefficient. Another shortcoming is the restrictions of these methods to certain data coordinates such as common source receiver geometry or Radon data coordinates. Further, weighting schemes in these methods do not provide data adaptive parameterization of noise estimation. There is a need for a method of enhancing the S/N ratio of seismic data which overcomes the shortcomings of the above described methods. The present invention provides a method which addresses this need.

SUMMARY OF THE INVENTION

The present invention includes a method for enhancing the signal-to-noise (S/N) ratio of seismic data while preserving true relative signal amplitudes in an entire data set of seismic traces. First, a set of input traces are acquired. The input traces are composed of trace amplitudes each of which contain signal and noise. Further, the input traces have first and second common coordinates, which are typically time and offset, respectively. The input traces are sorted into a plurality of ensembles of input traces wherein each trace of an ensemble has common first and second coordinates. The first coordinates are typically time, depth or tau. The second coordinates are typically shot-to-group offset or reflection angle, etc.

Each ensemble of input traces is conditioned based on a velocity model to produce an ensemble of aligned traces which have aligned signals. Each ensemble of aligned traces is then preferably decomposed into one or more frequency bands of traces.

In a preferred embodiment of this invention, the time dependent trace power in each trace of each frequency band is then computed. Similarly, the time dependent signal trace power in each frequency band is ideally computed. Also, the maximum allowable S/N Ratio ($\beta$) is preferably then estimated at each time step within each frequency band.

Rms inverse noise weights w are then calculated for signal rms for each time step for each trace in a frequency band. The weighting schemes used to calculate the weights ideally provide data adaptive parameterization of noise estimation. That is, parameters in the weighting scheme can be adjusted to account for noise characteristics such as degree of spatial coherence, the degree of Gaussian versus non-Gaussian noise distribution, etc. Further, these weights are calculated so that when using the present method of enhancing the signal-to-noise ratio of traces, the true relative signal amplitude of output traces corresponds to that of the input traces.

The trace amplitudes in each frequency band are reformed using the calculated weights to create true relative signal amplitude enhanced trace amplitudes. The enhanced trace amplitudes of the frequency bands are recombined to form output trace amplitudes having enhanced signal-to-noise ratio relative to the corresponding input trace amplitudes of an ensemble.

The traces for each of the remaining ensembles of input trace amplitudes are then similarly processed to create a plurality of ensembles of output trace amplitudes having enhanced signal-to-noise ratio.

It is an object of the present invention to provide a method for enhancing the S/N ratio in seismic data by using a novel frequency dependent true amplitude noise weighting scheme.

It is another object to provide a method wherein weights are preferably calculated from trace power statistics using a true relative amplitude weighting function which leverages the benefits of normalized, noise weighted stacking.

It is another object to provide an enhanced output trace for every input trace of an ensemble of traces by using a time and frequency dependent true relative amplitude weighting scheme.

Still yet another object is to preserve true relative amplitudes within each ensemble of traces as well as across the entire set of ensembles of traces comprising a set of seismic data.

An additional object is to provide a general S/N enhancement method that can be used iteratively to shape the noise distributions of output traces of an ensemble.

Another object is to provide a general method that is not restricted to a single set of data coordinates such as time offset or depth or tau or depth angle. Rather, the method can be applied across a number of optimal coordinate systems for a number of purposes by using appropriate coordinate translations.

BRIEF DESCRIPTION OF THE DRAWINGS

These and other objects, features and advantages of the present invention will become better understood with regard to the following description, pending claims and accompanying drawings where:

BEST MODE(S) FOR CARRYING OUT THE INVENTION

I. Introduction

Figure 1:
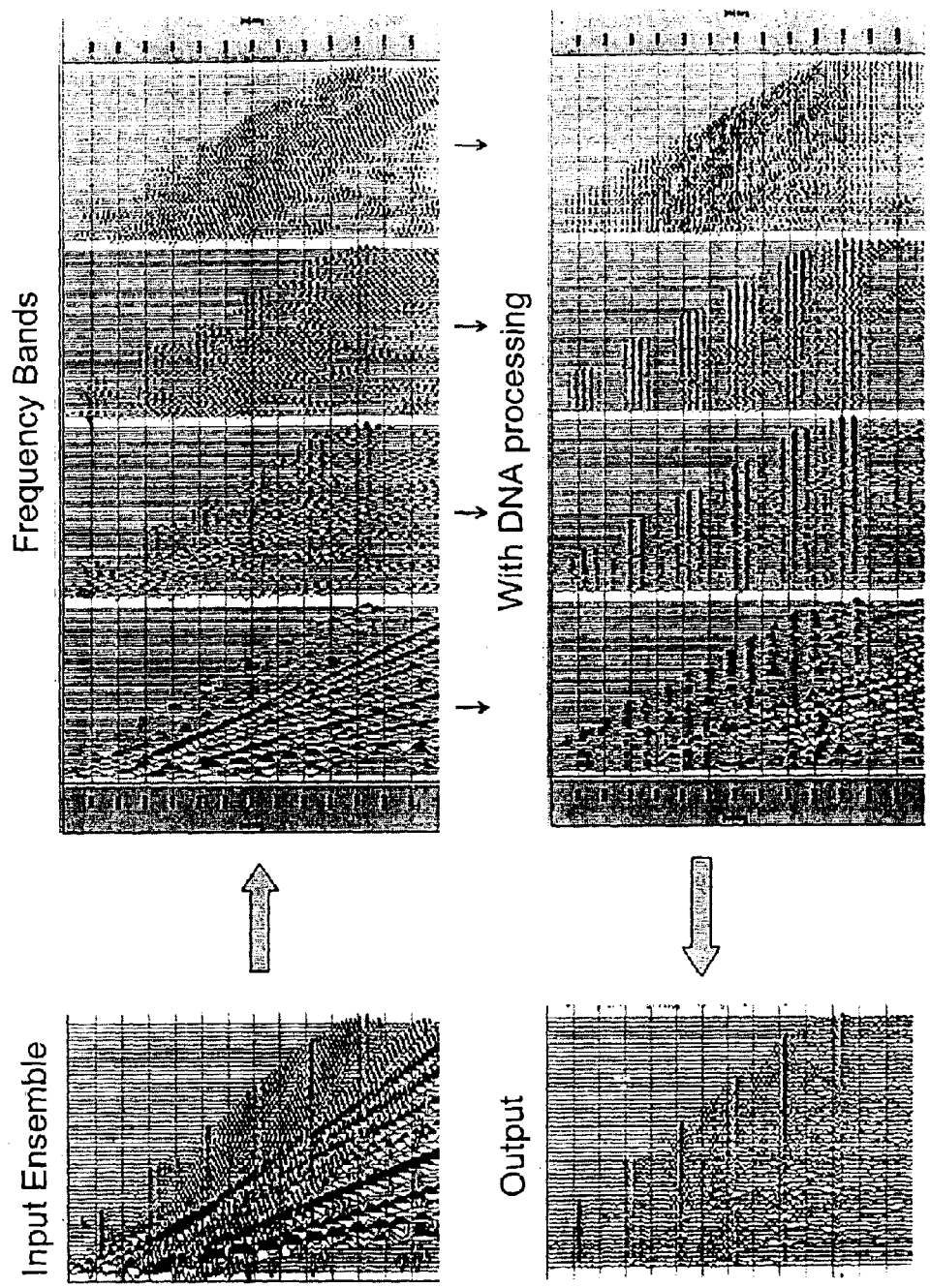
FIG. 1 illustrates a schematic flowchart showing steps used in converting an ensemble of input traces into signal enhanced output traces using the present invention.

The present invention calculates and uses weights which, when applied to input seismic data, produces output seismic data having trace amplitudes with enhanced S/N ratio and with minimal distortion of relative signal amplitudes between traces. FIG. 1 shows an example where an ensemble of input seismic traces is decomposed into four frequency bands of trace amplitudes. These trace amplitudes are processed according to steps of the present invention, utilizing a unique set of true relative amplitude inverse noise weights, which produce frequency bands having enhanced trace amplitudes. These frequency bands are then recombined to form an output trace for each input trace of the ensemble. The output seismic trace amplitudes have enhanced S/N ratio as compared to the input seismic trace amplitudes. Furthermore, the output relative signal amplitudes remain generally unchanged from that of the input relative signal amplitudes.

Weights are preferably computed in separate overlapping frequency bands in order to accommodate variations in frequency dependent S/N ratios.

Noise power estimates are ideally computed from Hilbert envelope trace power statistics and a specified maximum S/N ratio or a maximum S/N ratio determined from data.

Relative and absolute signal relationships are preserved within a group of traces by using a normalized weighted fitting of a Zoeppritz type amplitude model to the group of traces.

II. Method of True Relative Signal Amplitude Noise Attenuation

Figure 2:
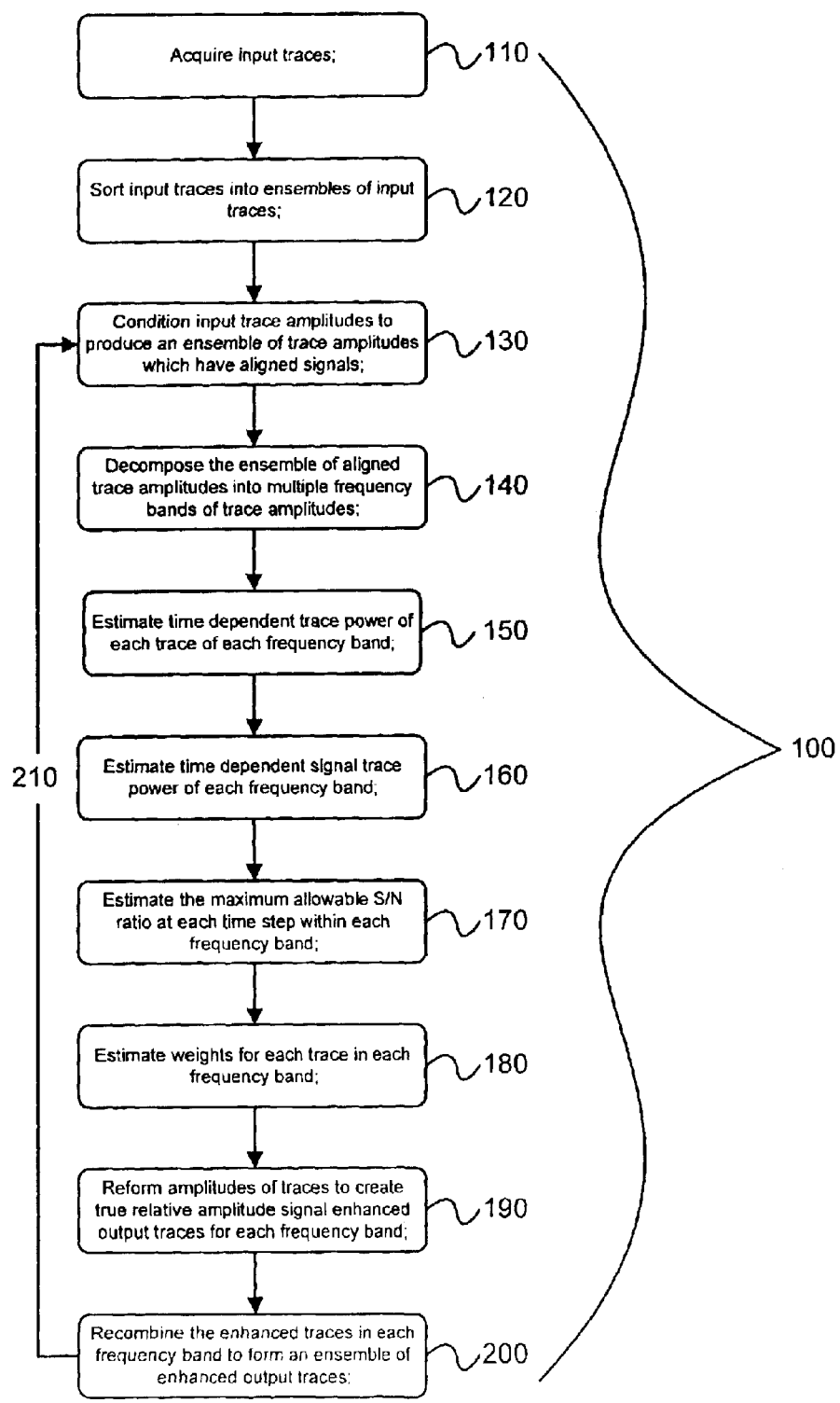
FIG. 2 is a flowchart describing steps used, in a preferred embodiment of the present invention, to enhance the seismic trace amplitudes of a set of seismic data.

FIG. 2 shows a flowchart describing an exemplary preferred embodiment of a method 100 for enhancing S/N ratio of seismic data which uses a true relative signal amplitude noise attenuation scheme. Steps 110–210 comprising method 100 will now be described in detail.

A. Step 110: Acquire Input Traces;

The first step 110 is to acquire input traces comprising a plurality of amplitudes. For example, the input traces may be raw seismic data from a seismic survey. Alternatively, the input traces may be from data previously processed through a seismic processing sequence.

The input trace amplitudes have components of both signal and noise. The signal component of the amplitudes is produced from reflections off of subsurface interfaces. The noise component may be produced from numerous sources including environmental, cultural and shot generated sources. Often the noise may overwhelm signal such that the signal in the traces is generally unrecognizable.

Each input trace has a first common coordinate and at least one second common coordinate. The first common coordinate is time in this preferred exemplary embodiment of the invention. Alternatively, the first common coordinate might be depth or tau. The second common coordinate characterizing the input traces might include, but is not limited to, common shot, receiver, depth point, ray parameter, angles, and offset or reflection point coordinates. The present method or invention may be effectively and serially used across several different common coordinates.

B. Step 120: Sort Input Traces into Ensembles of Input Traces;

The next step 120 is to sort the input traces into multiple ensembles of the input traces. Each of the traces in an ensemble has a common second coordinate. For example, a common second coordinate may be common offset or common depth point (CDP) or common shot or receiver coordinates.

C. Step 130: Condition Input Trace Amplitudes to Produce an Ensemble of Trace Amplitudes Which Have Aligned Signals;

The next step 130 is to condition the input trace amplitudes of an ensemble so that their signals are aligned within the first common coordinate, i.e., time. Consequently, an ensemble of trace amplitudes having aligned signals is produced. This step 130 commonly corresponds with application of normal moveout correction to seismic traces. Alignments are based upon a velocity model. The velocity model may be an explicit velocity model such as velocity functions derived from a velocity analysis. Alternatively, rather than using an explicit velocity model, an implied velocity model may be used. The term "implied velocity model" includes using a coherence based time alignment algorithm, such as trim statics.

D. Step 140: Decompose the Ensemble of Aligned Trace Amplitudes into Multiple Frequency Bands of Trace Amplitudes;

The ensemble of aligned trace amplitudes of step 130 is then decomposed into trace amplitudes within different frequency bands. As seen in FIG. 1, an ensemble of aligned trace amplitudes is decomposed into four frequency bands in this particular example. Frequency, as used herein, is preferably the inverse of the first common coordinate characterizing a trace, i.e. time. Preferably, the frequency bands are overlapping and amplitude conserving. Amplitude conserving implies that the frequency bands can be recombined in a forward or reverse mathematical process without significant loss of amplitude data.

In this preferred embodiment, decomposition may be accomplished by using a series of overlapping Gaussian bandpass filters. As another example, decomposition may be performed using Ormsby bandpass filters. Other well known decomposition filters or methods might also be used to decompose an ensemble of aligned trace amplitudes into frequency bands of trace amplitudes.

Although not preferred, it is within the scope of this invention to decompose the ensemble of aligned trace amplitudes into a single frequency band.

E. Step 150: Estimate Time Dependent Trace Power $$(\sigma_p^2)$$

of Each Trace in Each Frequency Band;

The time dependent trace power $$\sigma_p^2$$

in each trace of each frequency band is then estimated in step 150 of this preferred exemplary embodiment. Each trace shall be referred to as a "p" trace. The p trace power $$\sigma_p^2$$

is preferably estimated by computing a dominant period averaged Hilbert envelope of a trace. Those skilled in the art will appreciate that there are numerous other alternatives for estimating p trace power. By way of example, and not limitation, the estimate of p trace power may be made by squaring and summing trace amplitudes and averaging with an operator that is proportional to the dominant period of the data.

F. Step 160: Estimate Time Dependent Signal Trace Amplitude and Power $$(\sigma_m^2)$$

of Each Frequency Band;

A time dependent signal trace power estimate $$\sigma_m^2$$

is formed in each of the frequency bands. This is accomplished in two steps in this exemplary embodiment. First, time dependent signal trace amplitudes are estimated by using a weighted summing criterion on all traces in a frequency band to form a signal trace which shall be referred to as the "m" trace. Alternatively, this first step could use a mean stacking or a median stacking algorithm to arrive at signal or m trace amplitude estimates. Next, the signal trace amplitudes are converted to signal trace power by computing the dominant period averaged Hilbert envelope of the time dependent signal trace amplitudes. Preferably, a computational method similar to that used in step 150 to calculate p trace power $$\sigma_p^2$$

is repeated here to get the time dependent signal trace power $$\sigma_m^2$$

estimates.

G. Step 170: Estimate the Maximum Allowable S/N Ratio ($\beta$) at Each Time Step Within Each Frequency Band;

An estimate of the maximum allowable S/N rms ratio ($\beta$) at each time step within each frequency band is formed in step 170. Preferably, at each time step, an rms value is selected that satisfies a user defined statistical average of the ensemble of trace rms values. For example, this statistical average may be the median, mode or mean of the ensemble of trace rms values. Preferably, the maximum allowable signal-to-noise ratio ($\beta$) for each time step is the signal trace rms $\sigma_m$ divided by the absolute value of the difference between the median trace rms and the signal trace rms. Alternatively, this maximum allowable S/N ratio $\beta$ can be set as an input parameter based on a visual analysis of the entire data set. Or else, although less preferred, a simple experience based estimate of the maximum allowable S/N ratio $\beta$ is chosen.

H. Step 180: Estimate Time Dependent True Relative Signal Amplitude Weights (w) for Each Trace in Each Frequency Band;

The next step 180 is to form weights w for each trace at each time step in each frequency band. Trace rms $\sigma_p$ and trace signal rms $\sigma_m$ may be used to arrive at an estimate for noise. The estimated weights calculated are then essentially a function of the inverse noise for a trace. Also, it is possible to use m top trace cross-correlation as an estimate of signal strength between the m and p traces rather than needing to calculate both signal trace rms and trace rms to arrive at weights. Further still, it is possible to use the signal trace rms, the trace rms and m top trace cross-correlation in determining weights. Those skilled in the art will appreciate other weighting functions are possible which generally use inverse noise attributes rather than the entire inverse trace attributes in arriving at weights to be used to attenuate the S/N ratio of input seismic data.

In a first embodiment, these weights are a function of the maximum trace power estimate and the difference between the m trace power and the individual p trace power of each trace under consideration. In the ensuing description, the weight calculations are specified with respect to trace rms $\sigma_p$ and $\sigma_m$ which are defined as the square root of trace power. More specifically, in this example, a weight is formed using the following general mathematical expression:

$$w = \frac{1}{\left(|c(\sigma_p - \sigma_m)|^\alpha + \left(\frac{\sigma_m}{1+\beta}\right)^\alpha\right)^{\frac{n}{\alpha}}} \quad (1)$$

where:

w=weight for each time step for each trace in a frequency band;

$\sigma_m$=signal trace rms for each time step for each trace in a frequency band;

n=coefficient dependent on the expected distribution of noise within an ensemble of trace amplitudes;

$\beta$=the maximum rms signal to noise ratio (S/N) of any trace in a frequency band (i.e., the rms S/N ratio of all traces with rms=$\sigma_m$ as determined in step 170);

$\alpha$=coefficient dependent upon noise coherence/incoherence;

c=a threshold value for S/N ratio for w=$\beta$; and $\sigma_p$=trace rms for each time step for each trace in a frequency band.

Noise conditions in seismic data will dictate the choice of parameter values for use in the above weight function of equation (1). In the case of normally distributed noise, appropriate parameter values are $\alpha=2$, $n=2$, and $c=1$. The usual value for $\alpha$ will be 2 for noise that is spatially incoherent. For noise that is completely spatially coherent, then $\alpha$ will be 1. For noise that is partially incoherent, then $\alpha$ will be a value between 1 and 2. The parameter n is appropriately set to 2 when least squares fitting (L2 norm) is applied to trace amplitudes but n may be set to other values when using other amplitude fitting criteria. i.e, n=1 for an L1 fitting algorithm. Fitting will be discussed further in association with step 190.

Another embodiment of calculating weights which accommodates large bursts of noise is described as follows. In this embodiment, weights are calculated using equation (1) with c chosen as approximately =1, and then modified using the following condition:

$$w=\beta \text{ when } w>c, \tag{2}$$

Figure 3:
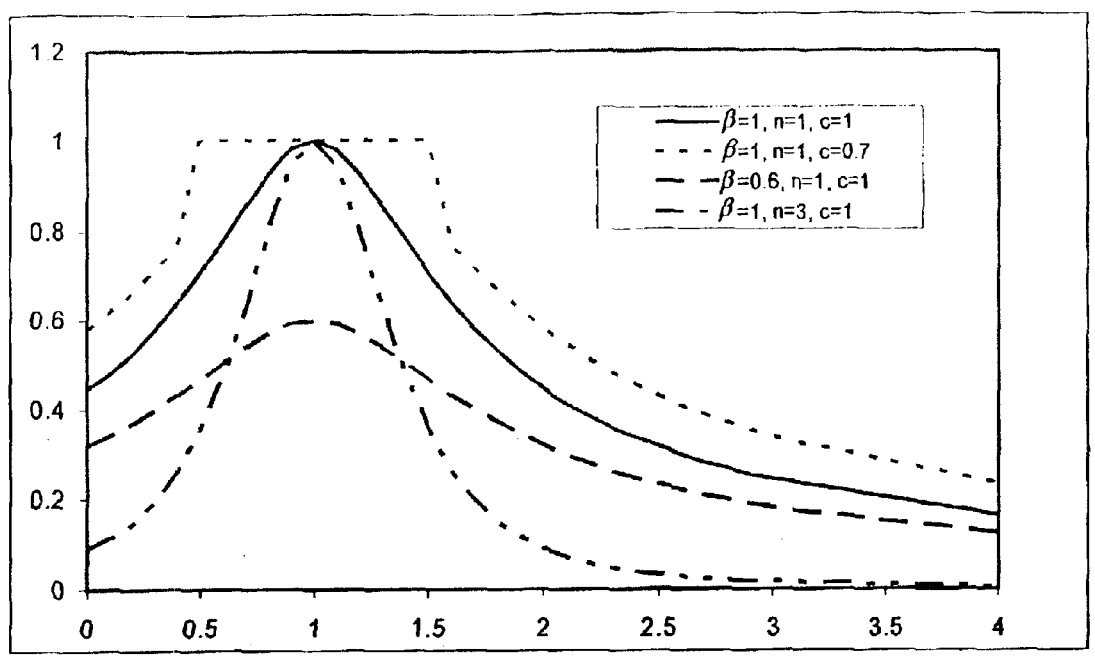
FIG. 3 is a graph showing variations of true amplitude weights as a function of weighting function parameters and trace rms.

FIG. 3 shows how the rms inverse noise weighting function w varies with n, c, and $\beta$. A base case corresponds to $\beta=1$, $n=1$, and $c=1$ and is shown by a solid line. A second case, where base parameters have been held constant but with c changed from 1.0 to 0.7, is shown by a dotted line. A third case, shown by a first dashed line, corresponds to changing $\beta=0.6$. In a fourth case, shown by a second dashed line, n is set to 3.

The base case parameters are most effective for noise distributions that are Gaussian. Other selections would be more appropriate for other non-Gaussian distributions. Preferably, the parameters in the weighting function are adapted to each frequency because noise characteristics vary with frequency. However, it is also possible to use a single satisfactory set of parameters which are acceptable to all frequency bands.

In practice, the values of the parameters n, c, and $\beta$ will be selected based on how well they reduce noise and enhance signal. This selection will be determined iteratively by examining sections showing the difference between the input data and the output data as well as the coherence and magnitude of the signal in the output data. Often this selection of optimal parameters is qualitatively determined by an experienced data processor.

Figure 4:
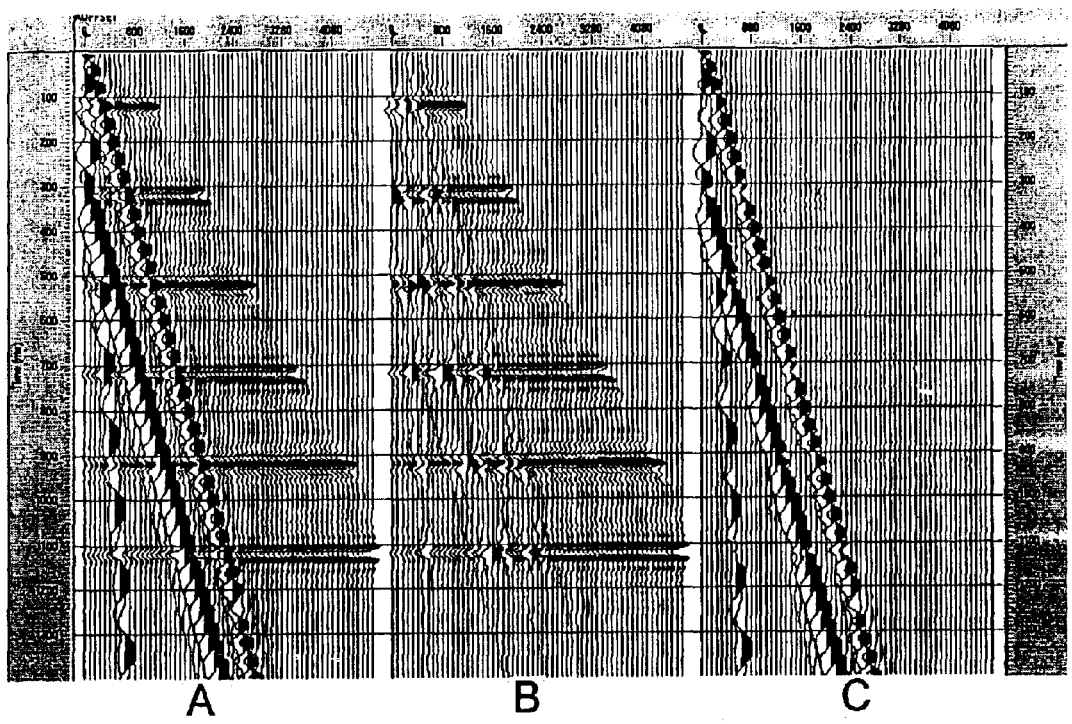
FIGS. 4A–C are respective graphs of an ensemble of input traces, an ensemble of S/N enhanced output traces, and the differences between the input and output traces.

FIGS. 4A–C show respective input, output and difference sections for a synthetic input data example. The difference sections show that high amplitude angled events and random noise have been removed from the input data. Also, the output data signal coherence and amplitude have been enhanced by the S/N processing which was made in accordance with this invention.

Alternative weighting functions estimate weights utilizing m and p trace rms as well as the zero-lag cross-correlation between m and p traces. These weighting functions use zero-lag cross-correlation of the m trace and p trace amplitudes plus $\sigma_p$ and $\sigma_m$ to replace $\sigma_p$-$\sigma_m$ in equation (1). More specifically, a function of the cross-correlation between m and p traces is used in the following expression for weights:

$$w = \frac{1}{\left(|cf(\phi_{mp}, \sigma_m, \sigma_p)|^\alpha + \left(\frac{\sigma_m}{1+\beta}\right)^\alpha\right)^{\frac{n}{\alpha}}} \tag{3}$$

where:

$\phi_{mp}$=zerolag cross-correlation between m and p trace amplitudes.

An example of the function $f$ is:

$$f[\phi_{mp}, \sigma_m, \sigma_p] = \sigma_p\left(1 - \frac{\phi_{mp}}{\sigma_m\sigma_p}\right) \tag{4}$$

In this case, the function $f$ is a measure of the rms noise in the amplitudes of the m trace and each p trace in the ensemble as well as the m to p trace cross-correlation. This weighting function will provide a more accurate estimate of the noise rms because the function $f$ utilizes more information between the m and p traces than using only rms values. Another example of the function $f$ is:

$$f[\phi_{mp},\sigma_m,\sigma_p]=\sqrt{\text{sign}(\phi_{mp})}-\sigma_m. \tag{5}$$

Note in this case, only values for signal trace rms $\sigma_m$ are calculated and values for trace rms $\sigma_p$ need not be calculated. Effectively, cross-correlation information improves the ability to accurately estimate signal in the presence of noise. Selection of the function $f$ in equation (3) will depend on the noise characteristics of the data which is being enhanced, i.e., distribution, coherence, incoherence of signal and noise.

I. Step 190: Reform Amplitudes of Traces in Each Frequency Band to Create True Relative Amplitude Signal Enhanced Traces;

The next step 190 is to reform the input trace amplitudes in each frequency band of step 140 using the weights from step 180 to form output trace amplitudes in each frequency band. A true amplitude fitting function, using the weights of step 180, is used to fit the input trace amplitudes. A fitted trace amplitude is computed for each of the input trace amplitudes.

A first option to reform the input trace amplitudes is to replace only certain of the input trace amplitudes in a frequency band. These amplitudes to be replaced are selected using a weighting function threshold. If the noise rms of a trace amplitude exceeds the threshold c (from equation (1)), then that particular trace amplitude is replaced by its corresponding fitted trace amplitude. This first option has a net effect of shaping the noise distribution in the output trace amplitudes to a desired distribution. For example, input amplitudes with a non-Gaussian noise distribution can be shaped to an output amplitude distribution having a more Gaussian-like noise distribution.

A second option is to replace all of the input trace amplitudes with enhanced trace amplitudes created using a true amplitude inverse noise weighted fitting process. This option is preferred for data that has been through extensive processing that has previously reduced the noise level in the amplitudes. It is usually not used for unprocessed (raw) input trace amplitudes.

In either option, a trace amplitude to be reformed is selected. A fixed number of adjacent trace amplitudes within an overlapping moving window of traces are fitted using an approximate form of a Zoeppritz reflection amplitude equation. This equation uses the inverse noise rms weights from step 180. This equation can accommodate sub-surface structural effects on trace amplitudes.

In addition, when applying this invention in different coordinate systems it may be necessary to change the ratio of the number of degrees of freedom (DOF) in the function or expression relative to the number of trace amplitudes being fit. For example, a 3 DOF fit may be appropriate for 30 traces while a 2 DOF fit may be effective for only a 20 trace fit. Or else, a 2 DOF fit in offset coordinate may be equivalent to a 3 DOF fit in common shot coordinate. In the fitting function below, i.e., equation (6) below, coefficients $A_0$, $A_1$, and $A_2$ represent 3 DOF.

A linearized Zoeppritz reflection amplitude equation is given by the following mathematical expression:

$$A = A_0 + A_1 \sin^2\theta + A_2 \tan^2\theta \quad (6)$$

where:

A=reflected signal amplitude;

$A_0, A_1, A_2$=are coefficients of linearized Zoeppritz reflection amplitude equation; and θ=incidence angle estimated from a velocity model.

Another approximation to this linearized Zoeppritz reflection amplitude equation is mathematically expressed as:

$$A = A_0 + A_1 x_i^2 \quad (7)$$

This approximation is satisfactory over a limited subset of adjacent traces. For example, overlapping windows containing 20 adjacent traces might be selected. Or else, the number of the adjacent traces in the moving window may be a fraction of the total number of traces in a frequency band such as $2/3$ of the traces. It should be appreciated that depending upon which coordinate system the fitting is being performed, a differing number of traces may be needed to optimize the results due to the effect of subsurface structures on signal amplitudes.

Another approximation to equation (6) is to solve only for coefficient $A_0$ in the following equation:

$$A = A_0 \quad (8)$$

The fitting in equations (6), (7) or (8), may be performed using a noise weighted least squares fitting algorithm. Alternatively, the fitting could be performed using noise weighted L1 or L3 algorithms.

The weighted least-squares problem which minimizes the L2 norm is given by:

$$L_2 = \sum_{i=1}^{N} \left( \frac{p_i - A_0 - A_1 x_i^2}{w_i} \right)^2 \quad (9)$$

The L2 error is minimized for $A_0$ and $A_1$ with the solution given by $$A_0 = \frac{\sum_{i=1}^{N} w_i^2 p_i \sum_{i=1}^{N} w_i^2 x_i^4 - \sum_{i=1}^{N} w_i^2 p_i x_i^2 \sum_{i=1}^{N} w_i^2 x_i^2}{\sum_{i=1}^{N} w_i^2 \sum_{i=1}^{N} w_i^2 x_i^4 - \left( \sum_{i=1}^{N} w_i^2 x_i^2 \right)^2} \quad (10)$$

$$A_1 = \frac{\sum_{i=1}^{N} w_i^2 \sum_{i=1}^{N} w_i^2 p_i x_i^2 - \sum_{i=1}^{N} w_i^2 p_i \sum_{i=1}^{N} w_i^2 x_i^2}{\sum_{i=1}^{N} w_i^2 \sum_{i=1}^{N} w_i^2 x_i^4 - \left( \sum_{i=1}^{N} w_i^2 x_i^2 \right)^2} \quad (11)$$

Then the replacement amplitude at location $X_j$, using equation (7), is given by:

$$A_R = A_0 + A_1 x_i^2 \quad (12)$$

$A_R$=S/N enhanced replacement amplitude;

$A_0$=Coefficient in approximate Zoeppritz amplitude fitting;

$A_1$=Coefficient in approximate Zoeppritz amplitude fitting;

$w_i$=Weights used in least squares fitting;

$p_i$=Trace rms values $x_i$=Location of amplitude to be replaced; and

N=Number of traces in overlapping trace windows.

Figure 5:
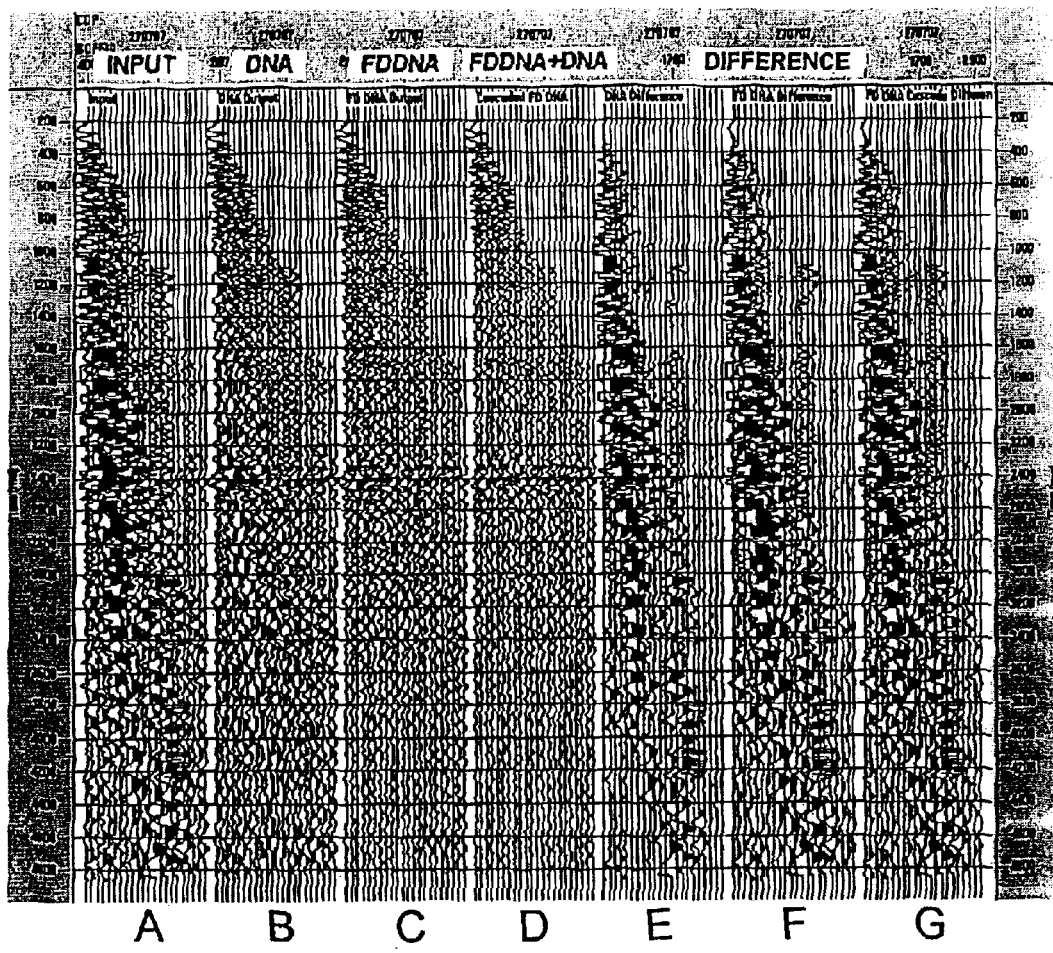
FIGS. 5A–G shows a single input ensemble (A), three output ensembles (B, C, D) generated with different weighting function parameter settings and three difference ensembles (E, F, G).

FIGS. 5A–G show an example of seismic data enhancement which was performed on actual seismic data. FIG. 5A is a single input ensemble. FIGS. 5B–D are output ensembles generated using the present invention. Finally, FIGS. 5E–G are output difference ensembles produced by subtracting the data of FIGS. 5B–D from the data of FIG. 5A, respectively. FIGS. 5A–G demonstrate that the present invention significantly reduces noise in the input seismic data. In particular, the difference ensembles show that high levels of coherent and incoherent noise have been removed from the input data.

J. Step 200: Recombine the Enhanced Traces in Each Frequency Band to Form an Ensemble of Enhanced Output Traces;

Step 200 is to recombine enhanced traces of the frequency bands into an ensemble of recomposed, enhanced traces. Each recomposed trace is the sum of the enhanced traces from each of the frequency bands having the same second common trace coordinate as each ensemble of input traces.

K. Step 210: Enhance Each Ensemble Formed in Step 120;

The next step is to process each of the ensembles formed in step 120 by repeating steps 130–200 until each of the ensembles of input traces has been enhanced in S/N ratio. These ensembles of enhanced S/N traces may then be used for further seismic data processing and analysis.

This invention can be used several times in a typical seismic processing flow. As an example, this invention can be used in an iterative fashion to shape the desired noise distribution for a subsequent processing step. For this case, the first pass would shape output trace amplitudes to a desired distribution such as a Gaussian distribution. In the next pass, the input noise distribution can be assumed to be Gaussian and parameters in the weighting function can be selected to optimally reduce the noise under these assumptions.

The use of this invention is not restricted to a single set of data coordinates such as time and offset or depth and tau or time and angle, etc. Rather, the invention may be applied across a broad set of data coordinate pairs. For example, a first run may be performed on input data that is sorted in time and offset as the two common coordinates. Later, after additional seismic processing steps, this invention may be used on data where different common coordinate pairs are selected such as tau and angle.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

What is claimed is:

1. A method for enhancing signal-to-noise (S/N) ratio of an ensemble of traces, the method comprising the steps of:

a. inputting an ensemble of traces, each trace having trace amplitudes;

b. estimating time dependent signal trace amplitudes and time dependent true relative signal trace attributes from the ensemble of traces;

c. estimating time dependent true relative amplitude trace attributes from the ensemble of traces;

d. estimating true relative amplitude inverse noise weights utilizing weighting functions which are functions of differences between the trace attributes and the estimated signal trace attributes;

and e. reforming the trace amplitudes using a fitting function which utilizes the true relative amplitude inverse noise weights to create true relative signal trace amplitudes having enhanced S/N ratio.

2. The method of claim 1 wherein:
the weights are calculated as a function of at least two of trace power, signal trace power, and cross-correlation between a signal trace amplitudes and traces amplitudes.

3. The method of claim 2 wherein:
the weights are a function of trace power and signal trace power.

4. The method of claim 2 wherein:
the weights are a function of signal trace power and cross-correlation between a signal trace amplitudes and traces amplitudes of the ensemble.

5. The method of claim 2 wherein:
the weights are a function of signal trace power, trace power and cross-correlation between signal traces and traces of the ensemble.

6. The method of claim 1 wherein:
the ensemble of traces are decomposed into frequency bands of trace amplitudes; and the weights are calculated as a function of:

$$w = \frac{1}{\left(\left|c(\sigma_p - \sigma_m)\right|^\alpha + \left(\frac{\sigma_m}{1+\beta}\right)^\alpha\right)^{\frac{n}{\alpha}}}$$

where:
w=weight for each time step for each trace in a frequency band;
$\sigma_m$ signal trace rms for each time step in a frequency band;
n=coefficient dependent on the expected distribution of noise within an ensemble of trace amplitudes;
$\beta$=the maximum allowable rms signal to noise ratio (S/N) of any trace in a frequency band;
$\alpha$=coefficient dependent upon noise coherence/incoherence;
c=a threshold value for S/N ratio for w=$\beta$; and
$\sigma_p$=trace rms for each time step for each trace in a frequency band.

7. The method of claim 1 wherein:
the ensemble of traces are decomposed into frequency bands of trace amplitudes; and the weights are calculated as a function of:

$$w = \frac{1}{\left(\left|cf(\phi_{mp}, \sigma_m, \sigma_p)\right|^\alpha + \left(\frac{\sigma_m}{1+\beta}\right)^\alpha\right)^{\frac{n}{\alpha}}}$$

where:
w=weight for each time step for each trace in a frequency band; $\sigma_m$=signal trace rms for each time step for each trace in a frequency band;
n=coefficient dependent on the expected distribution of noise within an ensemble of trace amplitudes;
$\beta$=the maximum allowable rms signal to noise ratio (S/N) of any trace in a frequency band;
$\alpha$=coefficient dependent upon noise coherence/incoherence;
c=a threshold value for S/N ratio for w=$\beta$;
$\sigma_p$=trace rms for each time step for each trace in a frequency band; and $\phi_{mp}$=zerolag cross-correlation between m signal trace and p trace amplitudes.

8. The method of claim 7 wherein:

$$f[\phi_{mp}, \sigma_m, \sigma_p] = \sigma_p\left(1 - \frac{\phi_{mp}}{\sigma_m \sigma_p}\right).$$

9. The method of claim 7 wherein:

$$f[\phi_{mp}, \sigma_m, \sigma_p] = \sqrt{\text{sign}(\phi_{mp})} \cdot \sigma_m.$$

10. The method of claim 1 wherein:
the weighting function includes parameters which may be changed to accommodate an anticipated noise characteristic within the ensemble of traces.

11. The method of claim 10 wherein:
the parameters are selectively chosen to accommodate the noise characteristic of noise distribution including at least one of a Gaussian noise distribution and a non-Gaussian noise distribution.

12. The method of claim 10 wherein:
the parameters are selectively chosen to accommodate the noise characteristic of spatial coherency.

13. The method of claim 1 wherein:
the method is used in more than one iteration within a seismic processing sequence to enhance the trace signal-to-noise ratio while maintaining true relative signal amplitude.

14. The method of claim 13 wherein:
the method is applied to seismic data in different coordinate systems during the more than one step of the method.

15. The method of claim 1 wherein:
the step of reforming the trace amplitudes using a fitting function includes utilizing an approximate form of a Zoeppritz reflection amplitude equation.

16. A method of enhancing signal-to-noise ratio of an ensemble of traces, the method comprising the steps of:
a. estimating the trace power in trace amplitudes of an ensemble of traces;
b. estimating signal trace power for the trace amplitudes of the ensemble;
c. estimating the maximum allowable signal-to-noise S/N ratio of any trace in the ensemble;
d. estimating inverse noise weights that are functions of the difference between the trace power and signal trace power, and the maximum allowable signal-to-noise S/N ratio for each trace in each time step; and
e. reforming the traces using the estimated inverse noise weights to create true relative amplitude signal enhanced traces.

17. The method of claim 16 wherein:
the ensemble of traces are decomposed into frequency bands of trace amplitudes; and the weights are calculated according to the mathematical expression:

$$w = \frac{1}{\left(\left|c(\sigma_p - \sigma_m)\right|^\alpha + \left(\frac{\sigma_m}{1+\beta}\right)^\alpha\right)^{\frac{n}{\alpha}}}$$

where:
w=weight for each time step for each trace in a frequency band;
$\sigma_m$=signal trace rms for each time step in a frequency band;

n=coefficient dependent on the expected distribution of noise within an ensemble of trace amplitudes;

$\beta$=the maximum allowable rms signal to noise ratio (S/N) of any trace in a frequency band;

$\alpha$=coefficient dependent upon noise coherence/incoherence;

c=a threshold value for S/N ratio for w=$\beta$; and $\sigma_p$=trace rms for each time step for each trace in a frequency band.

18. A method for enhancing signal-to-noise ratio of seismic data, the method comprising the steps of:
   a. acquiring input traces, each input trace including a plurality of amplitudes having noise and signal and each input trace further having a first common coordinate and at least one second common coordinate;
   b. sorting the input traces into a plurality of ensembles of input traces having a common coordinate;
   c. conditioning an ensemble of input traces based on a velocity model to produce an ensemble of aligned trace amplitudes which have aligned signals;
   d. decomposing the ensemble of aligned traces into a plurality of frequency bands of trace amplitudes;
   e. estimating the time dependent trace attributes in each trace amplitude of each frequency band;
   f. estimating the time dependent signal trace attributes of each frequency band;
   g. estimating the maximum allowable signal-to-noise ratio at each time step within each frequency band;
   h. estimating true relative amplitude time dependent inverse noise weights using a weighting function which is a function of differences between trace and signal trace attributes;
   i. reforming the trace amplitudes in each frequency band using a true amplitude fitting function which utilizes the weights to fit the input trace amplitudes to create true relative amplitude signal enhanced trace amplitudes for each of the frequency bands;
   j. recombining the enhanced trace amplitudes to form output traces each having an enhanced signal-to-noise ratio relative to the corresponding input trace of the ensemble; and
   k. repeating steps c–j for each of the remaining ensembles of input traces to create a plurality of ensembles of output traces having true relative amplitude enhanced signal-to-noise ratio.

19. The method of claim 18 wherein:
   a fixed number of adjacent trace amplitudes are fitted using an approximate form of a Zoeppritz reflection amplitude equation.

20. The method of claim 18 wherein:
   the weighting function includes parameters which may be changed to accommodate the anticipated characteristics of the noise contained within a frequency band.

21. The method of claim 18 wherein:
   the method is used more than one step within a processing sequence to improve trace signal-to-noise ratio while maintaining true relative signal amplitude.

22. The method of claim 1 wherein:
   the weighting function is stabilized by a stabilization factor.

23. The method of claim 22 wherein:
   the stabilization factor is an allowable signal to noise ratio.

24. The method of claim 23 wherein:
   the stabilization factor is the maximum allowable signal to noise ratio $\beta$.

25. The method of claim 22 wherein:
   the stabilization factor is calculated based upon attributes related to at least one of the signal trace amplitudes and the trace amplitudes.

26. The method of claim 22 wherein:
   the stabilization factor is selected by a user.

* * * * *